United States Patent
Lo et al.

(10) Patent No.: US 9,834,315 B2
(45) Date of Patent: *Dec. 5, 2017

(54) AIRCRAFT FUEL DEOXYGENATION SYSTEM

(71) Applicant: HONEYWELL INTERNATIONAL INC., Morristown, NJ (US)

(72) Inventors: Charles Lo, Peoria, AZ (US); Eric Blumer, Scottsdale, AZ (US); Dan Laboda, Niles, MI (US); Alexander Bershitsky, Northbrook, IL (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 428 days.

This patent is subject to a terminal disclaimer.

(21) Appl. No.: 14/570,152

(22) Filed: Dec. 15, 2014

(65) Prior Publication Data

US 2016/0167802 A1 Jun. 16, 2016

(51) Int. Cl.
*B01D 19/00* (2006.01)
*B64D 37/34* (2006.01)
(Continued)

(52) U.S. Cl.
CPC ......... *B64D 37/34* (2013.01); *B01D 19/0005* (2013.01); *B01D 19/0047* (2013.01);
(Continued)

(58) Field of Classification Search
CPC ..... B64D 37/34; B01D 19/00–19/0495; B01D 35/02; B01D 46/00
(Continued)

(56) References Cited

U.S. PATENT DOCUMENTS

| 2,575,568 A | 11/1951 | Topanelian, Jr. |
| 3,233,389 A | 2/1966 | Dahlen |

(Continued)

FOREIGN PATENT DOCUMENTS

| AU | 573534 | 8/1983 |
| EP | 0475930 A1 | 3/1992 |

(Continued)

OTHER PUBLICATIONS

USPTO Office Action for U.S. Appl. No. 14/310,531 dated Jun. 30, 2016.

(Continued)

*Primary Examiner* — T. Bennett McKenzie
(74) *Attorney, Agent, or Firm* — Lorenz & Kopf, LLP

(57) ABSTRACT

An aircraft fuel deoxygenation system includes a boost pump, a contactor-separator, and a centrifuge-separator pump. The boost pump is adapted to receive fuel from a fuel source and inert gas from an inert gas source, and is configured to mix the fuel and inert gas and supply a fuel/gas mixture. The contactor-separator is coupled to receive the fuel/gas mixture and is configured to remove oxygen from the fuel and thereby generate and supply deoxygenated fuel with entrained purge gas and separated purge gas. The centrifuge-separator pump is coupled to receive the deoxygenated fuel with entrained purge gas and is configured to separate and remove the entrained purge gas from the deoxygenated fuel and supply the deoxygenated fuel and additional purge gas.

18 Claims, 5 Drawing Sheets

(51) Int. Cl.
*B01D 35/02* (2006.01)
*B01D 46/00* (2006.01)

(52) U.S. Cl.
CPC ..... *B01D 19/0057* (2013.01); *B01D 19/0068* (2013.01); *B01D 35/02* (2013.01); *B01D 46/00* (2013.01)

(58) Field of Classification Search
USPC ............ 96/187; 95/43–56; 244/135 R–135 C
See application file for complete search history.

(56) References Cited

U.S. PATENT DOCUMENTS

| | | |
|---|---|---|
| 3,663,117 A | 5/1972 | Warren |
| 3,691,730 A | 9/1972 | Hickey et al. |
| 3,788,039 A | 1/1974 | Bragg |
| 3,847,298 A | 11/1974 | Hamilton |
| 3,948,626 A | 4/1976 | Bragg |
| 4,017,276 A | 4/1977 | Bloem |
| 4,190,030 A | 2/1980 | Chester |
| 4,890,980 A | 1/1990 | Heald et al. |
| 4,895,683 A | 1/1990 | Iwasaki |
| 4,900,335 A | 2/1990 | Algers |
| 5,061,151 A | 10/1991 | Steiger |
| 5,112,357 A | 5/1992 | Bjerklund et al. |
| 5,207,734 A | 5/1993 | Day et al. |
| 5,316,682 A | 5/1994 | Keyser et al. |
| 5,405,497 A | 4/1995 | Torregrossa |
| 5,472,567 A | 12/1995 | Torregrossa |
| 5,522,917 A | 6/1996 | Honda et al. |
| 5,529,701 A | 6/1996 | Grisham et al. |
| 5,531,904 A | 7/1996 | Grisham et al. |
| 5,662,811 A | 9/1997 | Grisham et al. |
| 5,858,283 A | 1/1999 | Burris |
| 5,863,031 A | 1/1999 | Veeder et al. |
| 6,004,386 A | 12/1999 | Grisham et al. |
| 6,053,249 A | 4/2000 | Stevenson et al. |
| 6,315,815 B1 | 11/2001 | Spadaccini et al. |
| 6,423,235 B1 | 7/2002 | Shimoi et al. |
| 6,431,528 B1 | 8/2002 | Kojima |
| 6,660,067 B2 | 12/2003 | Stacy et al. |
| 6,709,492 B1 | 3/2004 | Spadaccini et al. |
| 6,822,125 B2 | 11/2004 | Lee et al. |
| 6,830,608 B1 | 12/2004 | Peters |
| 6,918,949 B1 | 7/2005 | Peters |
| 6,939,392 B2 | 9/2005 | Huang et al. |
| 7,093,437 B2 | 8/2006 | Spadaccini et al. |
| 7,104,530 B2 | 9/2006 | Boye |
| 7,153,343 B2 | 12/2006 | Burlatsky et al. |
| 7,186,328 B1 | 3/2007 | Schultz et al. |
| 7,231,768 B2 | 6/2007 | Spadaccini et al. |
| 7,260,926 B2 | 8/2007 | Sabatino et al. |
| 7,264,655 B2 | 9/2007 | Joynson |
| 7,326,283 B2 | 2/2008 | Gardner et al. |
| 7,806,966 B2 | 10/2010 | Bose |
| 7,819,275 B2 | 10/2010 | Stodd et al. |
| 7,892,321 B2 | 2/2011 | Aagesen et al. |
| 7,896,292 B2 | 3/2011 | Limaye et al. |
| 8,221,070 B2 | 7/2012 | Baryshnikov |
| 8,388,740 B2 | 3/2013 | Sohn et al. |
| 8,602,362 B2 | 12/2013 | Buchwald |
| 9,334,109 B1 | 5/2016 | Mueller et al. |
| 2005/0019623 A1 | 1/2005 | Shoji et al. |
| 2005/0211096 A1 | 9/2005 | Burlatsky |
| 2005/0274649 A1 | 12/2005 | Spadaccini |
| 2006/0113248 A1* | 6/2006 | Koenig ................. B01F 5/0476 210/640 |
| 2006/0169138 A1 | 8/2006 | Schmidt |
| 2006/0278073 A1 | 12/2006 | McHugh |
| 2008/0095681 A1 | 4/2008 | Koenig |
| 2009/0156875 A1 | 6/2009 | Tomioka et al. |
| 2011/0131870 A1 | 6/2011 | Poirier et al. |
| 2012/0118154 A1 | 5/2012 | Wu et al. |
| 2013/0068660 A1 | 3/2013 | Bergeron et al. |
| 2013/0219914 A1 | 8/2013 | Budge |

FOREIGN PATENT DOCUMENTS

| | | |
|---|---|---|
| EP | 0645168 B1 | 6/1997 |
| EP | 1958691 A1 | 8/2008 |
| EP | 1579902 B1 | 2/2009 |
| EP | 2631281 A3 | 9/2013 |
| GB | 735866 A | 8/1955 |
| WO | 9402234 | 2/1994 |
| WO | 02/28714 A1 | 4/2002 |
| WO | 03/024582 A1 | 3/2003 |
| WO | 2013110950 | 8/2013 |

OTHER PUBLICATIONS

Roan, Melissa A. and Andre L. Boehman, "The Effect of Fuel Composition and Dissolved Oxygen on Deposit Formation from Potential JP-900 Basestocks." American Chemical Society, Apr. 13, 2004.
Deuel, Charles L. "Compact Seawater Deoxygenation System Improvements for Floating Production Facilities," SPE International, SPE 74358, Feb. 10-12, 2002.
Vielvoye, Roger, "World's Largest TLP Moves Onto Deepwater Norwegian Location," Oil and Gas Journal, May 4, 1992.
USPTO Notice of Allowance for U.S. Appl. No. 14/539,279 dated Dec. 14, 2016.
EP Extended Search Report for Application No. 16150501.1-1607, dated Jun. 10, 2016.
EP Search Report for Application No. 15198311.1-1754, dated May 24, 2016.
USPTO Notice of Allowance for U.S. Appl. No. 14/310,531 dated Mar. 2, 2017.
USPTO Notice of Allowance for U.S. Appl. No. 14/539,279 dated Feb. 23, 2017.
USPTO Notice of Allowance for U.S. Appl. No. 14/310,531 dated Nov. 14, 2016.
USPTO Office Action for U.S. Appl. No. 14/597,938 dated Mar. 24, 2017.
E.S. Rosa, et al. "The cyclone gas-liquid separator: operation and mechanistic modeling," IEEE Acal Energy Limited, Aug. 1, 2013.
S. Darrah; "Jet Fuel Deoxygenation" DTIC; http://www.dtic.mil/dtic/tr/fulltext/u2/a205006.pdf Oct. 1988.
Patel et al. "Cascade Distillation System" A water recovery system for deep space missions, Jan. 2014, vol. 6, Issue No. 1.
Lo et al. "Fuel Deoxygenation System Contactor-Separator" U.S. Appl. No. 14/539,279, filed Nov. 12, 2014.
Johnson et al.; Fuel Deoxygenation and Fuel Tank Inerting System and Method; U.S. Appl. No. 14/310,531, filed Jun. 20, 2014.
Lo et al.; Centrifugal Fuel Pump With Variable Pressure Control; U.S. Appl. No. 14/597,938, filed Jan. 15, 2015.

* cited by examiner

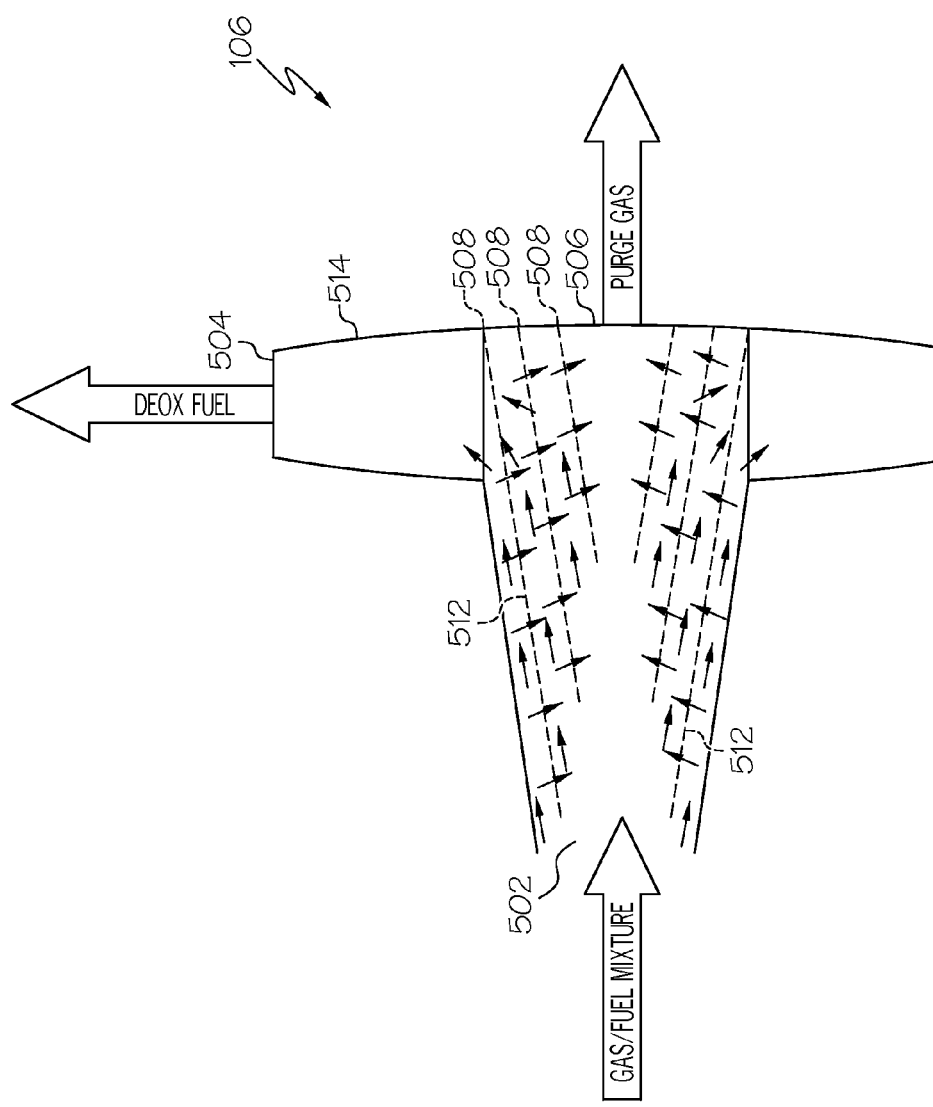

AIRCRAFT FUEL DEOXYGENATION SYSTEM

TECHNICAL FIELD

The present invention generally relates to fuel deoxygenation, and more particularly relates to systems for deoxygenating aircraft fuel.

BACKGROUND

Modern aircraft rely on efficient heat sink options for thermal management. The jet fuel that is supplied to the propulsion engines is often a convenient sink for excess thermal energy, and the energy is efficiently retained in the engine thermodynamic cycle. The presence of molecular oxygen or entrained air limits the ability of fuel to absorb heat beyond approximately 300° F. without undergoing deleterious thermal degradation. Thermal degradation often appears as solid materials which adhere to surfaces and degrades fuel system performance. Moreover, wetted surfaces comprised of metallic materials can further catalyze the reaction of oxygen with fuel and subsequent formation of carbonaceous, coke-like material.

It is possible to substantially reduce coke-based fuel degradation by removing oxygen from the fuel prior to increasing the fuel temperature beyond about 300° F. Several deoxygenation techniques have been developed. However, these often use equipment that is subject to fouling, which can lead to increased maintenance, and/or process steps that are difficult to control. The equipment used for fuel deoxygenation is also implemented separate from the aircraft engine.

Therefore, there is a need for a relatively low-maintenance, and/or relatively easy-to-control deoxygenation system that may be implemented as part of an aircraft engine. The present disclosure addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an aircraft fuel deoxygenation system includes a boost pump, a contactor-separator, and a centrifuge-separator pump. The boost pump is adapted to receive fuel from a fuel source and inert gas from an inert gas source, and is configured to mix the fuel and inert gas and supply a fuel/gas mixture. The contactor-separator is coupled to receive the fuel/gas mixture and is configured to remove oxygen from the fuel and thereby generate and supply deoxygenated fuel with entrained purge gas and separated purge gas. The centrifuge-separator pump is coupled to receive the deoxygenated fuel with entrained purge gas and is configured to separate and remove the entrained purge gas from the deoxygenated fuel and supply the deoxygenated fuel and additional purge gas.

In another embodiment, an aircraft fuel deoxygenation system includes a boost pump, a passive contactor-separator, a centrifuge-separator pump, and a gas pump. The boost pump is adapted to receive fuel from a fuel source and inert gas from an inert gas source, and is configured to mix the fuel and inert gas and supply a fuel/gas mixture. The passive contactor-separator is coupled to receive the fuel/gas mixture and is configured to remove oxygen from the fuel and thereby generate and supply deoxygenated fuel with entrained purge gas and separated purge gas. The centrifuge-separator pump is coupled to receive the deoxygenated fuel with entrained purge gas and is configured to separate and remove the entrained purge gas from the deoxygenated fuel and supply the deoxygenated fuel and additional purge gas. The gas pump is coupled to receive the separated purge gas from the contactor-separator and the additional purge gas from the centrifuge-separator pump and is configured to supply pressurized purge gas to the inert gas source.

In yet another embodiment, an aircraft fuel deoxygenation system includes an inert gas source, a boost pump, a contactor-separator, a centrifuge pump, and a liquid ring vacuum pump. The inert gas source is for supplying inert gas. The boost pump is adapted to receive fuel from a fuel source and inert gas from the inert gas source, and is configured to mix the fuel and inert gas and supply a fuel/gas mixture. The contactor-separator is coupled to receive the fuel/gas mixture and is configured to remove oxygen from the fuel and thereby generate and supply deoxygenated fuel with entrained purge gas and separated purge gas. The centrifuge-separator pump is coupled to receive the deoxygenated fuel with entrained purge gas and is configured to separate and remove the entrained purge gas from the deoxygenated fuel and supply the deoxygenated fuel and additional purge gas. The liquid ring vacuum pump is coupled to receive the separated purge gas from the contactor-separator and the additional purge gas from the centrifuge-separator pump and configured to supply pressurized purge gas to the inert gas source.

Furthermore, other desirable features and characteristics of the fuel deoxygenation system will become apparent from the subsequent detailed description and the appended claims, taken in conjunction with the accompanying drawings and the preceding background.

BRIEF DESCRIPTION OF THE DRAWINGS

The present embodiments will hereinafter be described in conjunction with the following drawing figures, wherein like numerals denote like elements, and wherein:

FIG. 5 depicts a simplified schematic representation of one embodiment of a centrifuge-separator pump that may be used to implement the system of FIG. 1.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
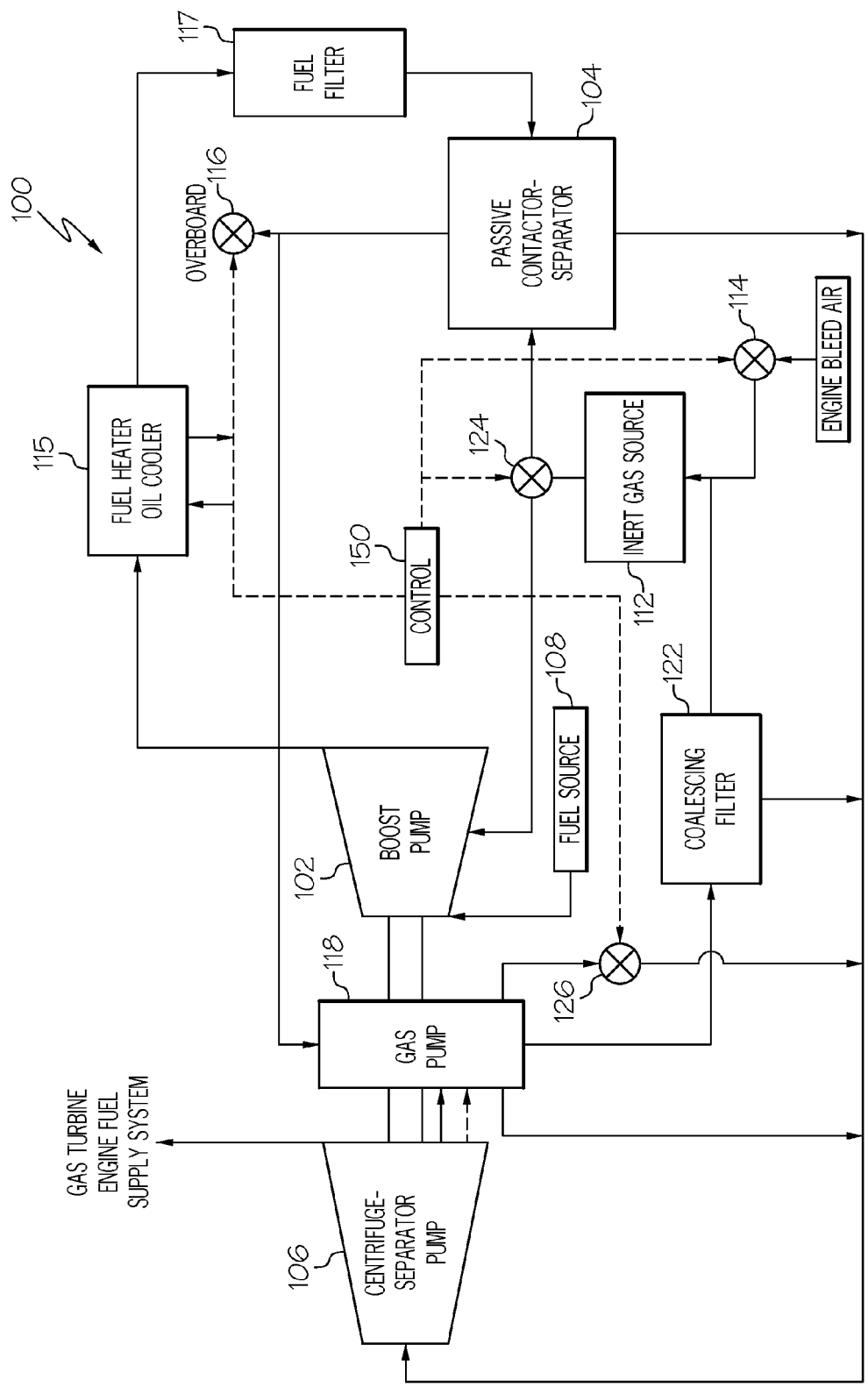
FIG. 1 depicts a schematic representation of one embodiment of an aircraft fuel deoxygenation system.

Referring first to FIG. 1, an embodiment of an aircraft fuel deoxygenation system 100 is depicted. The depicted system 100 includes at least a boost pump 102, a contactor-separator 104, and a centrifuge-separator pump 106. The boost pump 102 is coupled to receive fuel from a fuel source 108 and inert gas from an inert gas source 112. It should be note that the fuel, under normal equilibrium conditions at standard temperature and pressure, will normally have some oxygen dissolved therein. The boost pump 102 is also coupled to receive a drive torque from a non-illustrated torque source, such as a motor or a gas turbine engine, and is configured to uniformly and intimately mix the fuel and inert gas to supply a fuel/gas mixture for subsequent deoxygenation.

It will be appreciated that the fuel source 108 and the inert gas source 112 may be variously configured and implemented. In the depicted embodiment, the fuel source 108 is preferably an onboard aircraft fuel tank that receives and stores fuel for use by various fuel-consuming loads, such as a gas turbine engine. The inert gas source 112 may be a stand-alone source of inert gas, such as an inert gas storage tank or one or more inert gas bottles. Alternatively, the inert gas source 112 may be an inert gas generating system that generates inert gas from, for example, engine bleed air that is selectively supplied from a non-illustrated gas turbine engine via a bleed air inlet valve 114. Some non-limiting examples of such systems include one or more of an on-board inert gas generating system (OBIGGS), a pressure swing adsorption (PSA) system, a catalytic reactor, a plurality of membranes, just to name a few. It will be appreciated that the inert gas is preferably nitrogen ($N_2$), but may be one of the other inert gasses.

It will additionally be appreciated that in some embodiments, such as the one depicted in FIG. 1, the system 100 may additionally include a heat exchanger 115 and a fuel filter 117 between the boost pump 102 and the contactor-separator 104. The heat exchanger 115 is coupled to receive the fuel/gas mixture from the pump 102 and a fluid from a non-illustrated fluid source. The fluid and fluid source may vary, but in one embodiment the fluid is lubricant, such as oil, supplied from a non-illustrated gas turbine engine. In such embodiments, the heat exchanger functions as a fuel heater/oil cooler. Regardless, the heat exchanger 115 is configured to transfer heat from the fluid to the fuel/gas mixture to thereby increase fuel/gas mixture temperature prior to supplying the fuel/gas mixture to the contactor-separator 104, to thereby increase the deoxygenation drive potential and improve deoxygenation efficiency.

The fuel filter 117 is coupled between the heat exchanger 115 and the contactor-separator 104. The fuel filter 117 is configured to remove particulate from the fuel/gas mixture, and break up inert gas bubbles in the fuel/gas mixture into relatively smaller sized bubbles. This latter function will improve the efficiency of the downstream deoxygenation processes.

Whether or not the system 100 includes the heat exchanger 115 and/or the fuel filter 117, the contactor-separator 104 is coupled to receive the fuel/gas mixture and is configured to implement the functions of both a contactor and a separator. In some embodiments, as depicted in FIG. 1, the contactor-separator 104 may also receive inert gas from the inert gas source 112. As is generally known, a contactor functions to intensify the mass-transfer of dissolved oxygen to the inert gas by maximizing the contact surface between the fuel and inert gas, and to providing further mixing of the fuel and inert gas to thereby facilitate efficient mass transfer. A separator functions to separate the deoxygenated fuel and the inert gas/oxygen purge gas that is generated. Thus, the contactor-separator 102, upon receipt of the fuel/gas mixture and, in some embodiments, the inert gas, removes a significant portion of the oxygen from the fuel and thereby generates and supplies deoxygenated fuel (e.g., <2-6% oxygen) and purge gas. The deoxygenated fuel is supplied to the centrifuge-separator pump 106, and the purge gas is directed overboard via an overboard control valve 116, or is directed to a gas pump 118 (described further below), or both.

Figure 2:
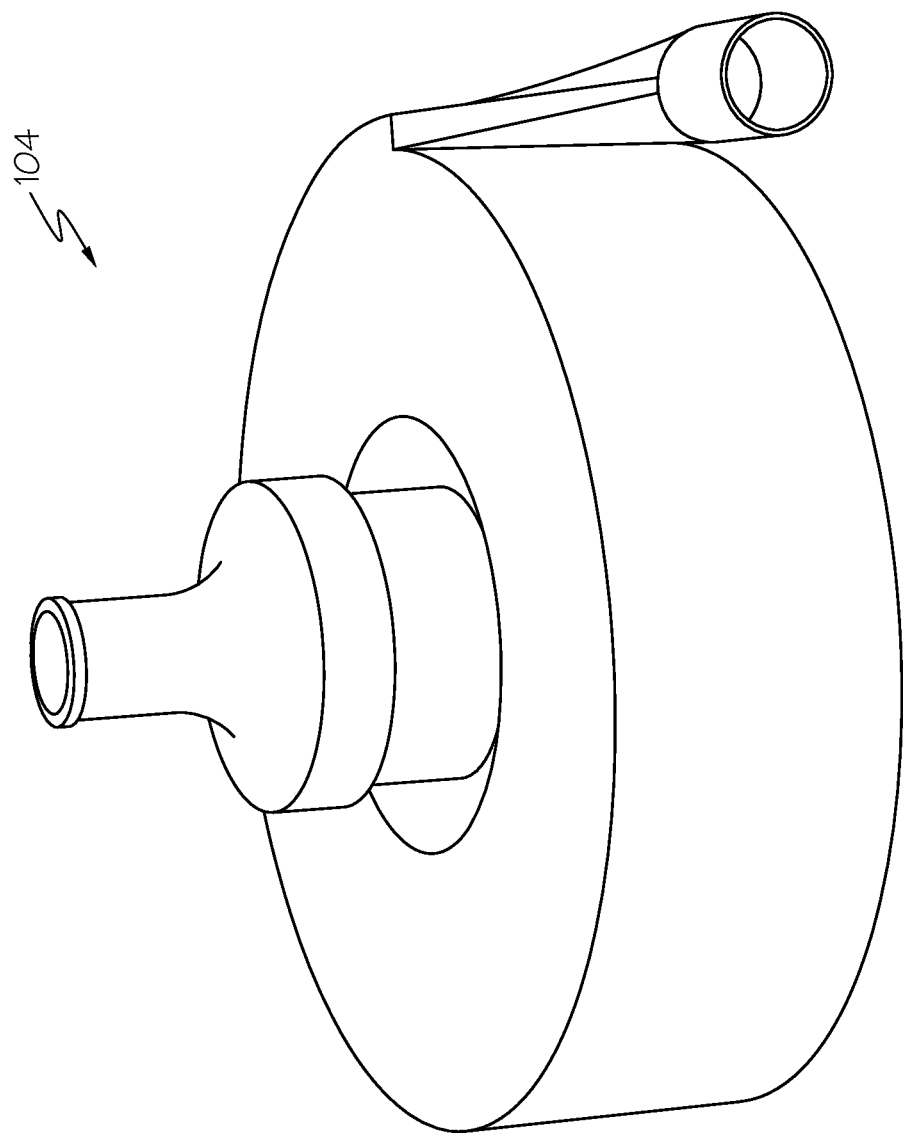
FIGS. 2 and 3 depict plan views of example embodiments of a passive transitional contactor-separator that may be used to implement the system of FIG. 1.
Figure 3:
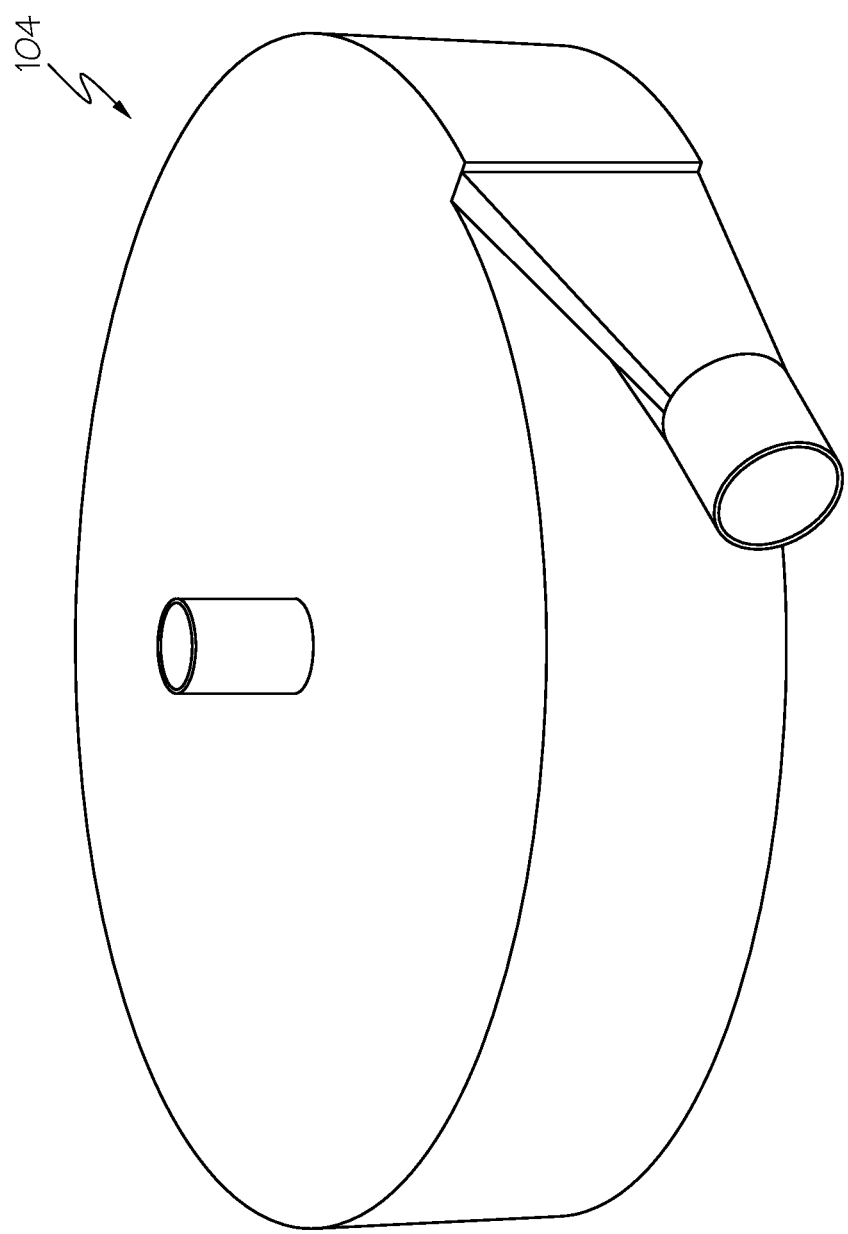

It will be appreciated that the contactor-separator 104 may be variously configured and implemented, but is preferably a passive device. In one embodiment, the passive contactor-separator 104 is configured and implemented using any one of the numerous passive contactor-separators 104 described in co-pending U.S. patent application Ser. No. 14/539,279, filed Nov. 12, 2014, and entitled, "FUEL DEOXYGENATION SYSTEM CONTACTOR-SEPARATOR." The entirety of that patent application is incorporated herein by reference. For completeness, two embodiments of the contactor-separators 104 described in that application are depicted herein in FIGS. 2 and 3. In another embodiment, the passive contactor-separator 104 is configured and implemented as an atomizing contactor-separator. One particular embodiment of an atomizing contactor-separator is depicted in FIG. 4, and with reference thereto will now be described.

Figure 4:
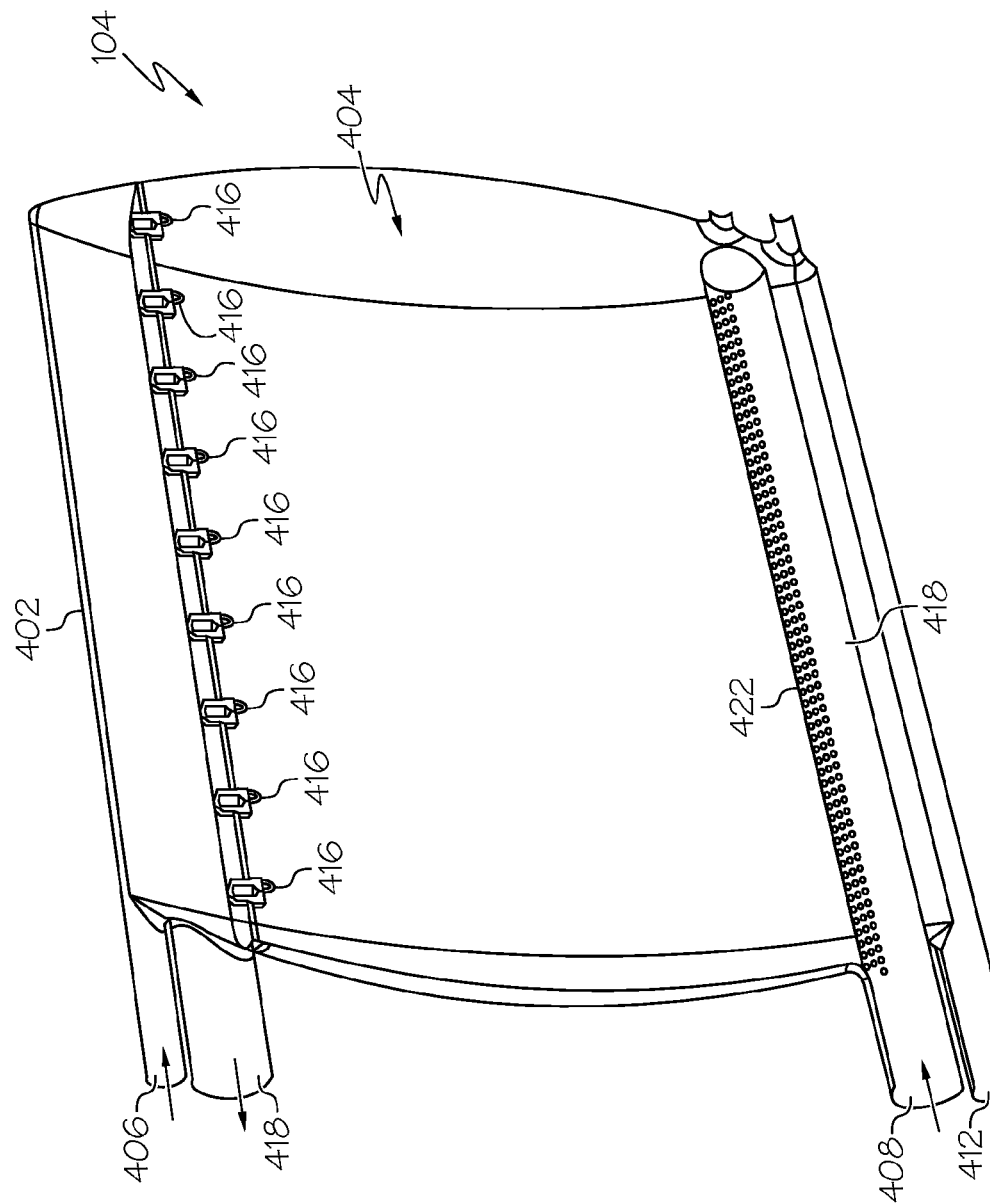
FIG. 4 depicts a cross section plan view of another embodiment of a passive contactor-separator that may be used to implement the system of FIG. 1.

The contactor-separator 104 depicted in FIG. 4 is a counter-flow atomizing contactor-separator that includes a main body 402 that defines an internal chamber 404. The main body 402 also includes a fuel/gas mixture inlet port 406, an inert gas inlet port 408, a fuel outlet port 412, and a purge gas outlet port 414. The fuel/gas mixture inlet port 406 is coupled to receive the fuel/gas mixture and directs the fuel/gas mixture to a plurality of spray nozzles 416 that are disposed within the internal chamber 404. The spray nozzles 416 are configured to such that when the fuel/gas mixture is discharged therefrom an aerosol is produced, and some of the gas in the fuel/gas mixture comes out of solution.

The inert gas inlet port 408 is coupled to receive the inert gas and directs the inert gas into a conduit 418 that is disposed in the internal chamber 404. The conduit 418 has a plurality of orifices 422 formed therein through which the inert gas is expelled. As the inert gas contacts the aerosol it equilibrates with at least some of the dissolved oxygen in the atomized fuel/gas mixture. The difference in oxygen concentration in the fuel and the inert gas causes dissolved oxygen in the fuel to be transferred to the inert gas, generating deoxygenated fuel and a purge gas. The deoxygenated fuel, which will have some entrained purge gas, is discharged via the fuel outlet port 412, and the purge gas that is not entrained in the fuel is discharged via the purge gas outlet 414.

Before proceeding further, it is noted that in some embodiments the system 100 may be implemented using either or both of the contactor-separators 104 described above.

Regardless of how the contactor-separator 104 is specifically implemented, the deoxygenated fuel and entrained purge gas, as noted above and as depicted in FIG. 1, is supplied to the centrifuge-separator pump 106. The centrifuge-separator pump 106 is configured, upon receipt of the deoxygenated fuel and entrained purge gas, to further separate the entrained purge gas from the deoxygenated fuel. The centrifuge-separator pump 106 may be variously configured to implement this function. One particular embodiment, which is depicted schematically in FIG. 5, will now be briefly described.

The depicted centrifuge-separator pump 106 includes a gas/fuel inlet 502, a deoxygenated fuel outlet 504, a purge gas outlet 506, a plurality of conical structures 508 having orifices 512 formed therein, and an impeller 514. The conical structures 508 and impeller 514 are connected to a common shaft that, at least in the depicted embodiment, is coupled to receive a drive torque from the same non-illustrated torque source, such as a motor or a gas turbine engine, as the boost pump 102. It will be appreciated that in other embodiments the torque source may not be the same one that is used for the boost pump 102.

The centrifuge-separator pump 106 is configured, upon receipt of the drive torque, to draw the deoxygenated fuel and entrained purge gas that is discharged from the contactor-separator 104 into the gas/fuel inlet 502. The centrifuge-separator pump 106 is further configured to separate the entrained purge gas from the deoxygenated fuel and supply the deoxygenated fuel and the separated purge gas. More specifically, when the deoxygenated fuel/entrained purge gas mixture is drawn into the gas/fuel inlet 502, the fuel is "slung" to the outer periphery, via the orifices 512 in the conical structures 508, separating the entrained purge gas from the deoxygenated fuel. The deoxygenated fuel is discharged out the deoxygenated fuel outlet 504 via the impeller 514. The additional purge gas is displaced, also via the orifices 512 in the conical structures, to the center portion of the centrifuge-separator pump 106 and is discharged via the purge gas outlet 506.

As FIG. 1 depicts, the deoxygenated fuel that is discharged from the centrifuge-separator pump 106 is supplied to a gas turbine engine supply system for use in a non-illustrated gas turbine engine. Preferably, the deoxygenated fuel that is discharged from the centrifuge-separator pump 106 is supplied to, for example, a high-pressure fuel pump, such as a gear pump or variable displacement piston pump, one or more additional control valves and components, and various heat sources to absorb waste thermal energy, before being supplied to the combustor.

As FIG. 1 further depicts, the additional purge gas that is discharged from the centrifuge-separator pump 106 is supplied to the gas pump 118. As previously mentioned, the gas pump 118 may also receive purge gas discharged from the contactor-separator 104. The gas pump 118 is configured to increase the pressure of the received purge gas and, when the inert gas source 112 is an inert gas generator, supply the pressurized purge gas to the inert gas source 112. Although the gas pump 118 may be implemented using any one of numerous types of gas pumps 118, it is preferably implemented using a liquid ring vacuum pump (LRVP) (where fuel is used for the sealing fluid), and thus receives a portion of the deoxygenated fuel (illustrated using a dashed line) from the centrifuge-separator pump 106, some spill-over of which is supplied back to the inlet of the centrifuge-separator pump 106. The structure and operation of LRVPs is generally well known in the art, and will thus not be provided. Preferably, as FIG. 1 depicts, the gas pump 118 is coupled to receive a drive torque from the same non-illustrated torque source, such as a motor or a gas turbine engine, as the boost pump 102 and the centrifuge-separator pump 106. It will be appreciated that in other embodiments the torque source may not be the same one that is used for the boost pump 102 and/or the centrifuge-separator pump 106.

The pressurized purge gas that is discharged from the gas pump 118 may include some fuel aerosol. Thus, in some embodiments, a coalescing filter 122 may be coupled between the gas pump 118 and the inert gas source 112. The coalescing filter 122, if includes, is configured to remove any fuel aerosol that may be present in the pressurized purge gas, thereby supplying substantially fuel-free purge gas to the inert gas source 112.

The system 100 may also include a control 150 that is configured to control the positions of various system valves, and thereby control the amount and flow of inert gas and/or purge gas in the system. The number and placement of the system valves may vary, but in the depicted embodiment the system 100 includes the previously mentioned bleed air inlet valve 114, the overboard control valve 116, an inert gas supply control valve 124, and a gas pump fuel discharge control valve 126.

The systems and a methods described herein remove dissolved and entrained air from fuel. Oxygen removal enables additional heat to be input to the fuel before deposits start to form, which improves aircraft specific fuel consumption (SFC), potentially by 0.5 to 2%. The system described herein may be integrated into a gas turbine engine fuel supply system.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth herein.

What is claimed is:
1. An aircraft fuel deoxygenation system, comprising:
   a boost pump adapted to receive fuel from a fuel source and inert gas from an inert gas source, the boost pump configured to mix the fuel and inert gas and supply a fuel/gas mixture;

a contactor-separator coupled to receive the fuel/gas mixture and configured to remove oxygen from the fuel and thereby generate and supply deoxygenated fuel with entrained purge gas and separated purge gas; and
a centrifuge-separator pump coupled to receive the deoxygenated fuel with entrained purge gas and configured to separate and remove the entrained purge gas from the deoxygenated fuel and supply the deoxygenated fuel and additional purge gas.

2. The system of claim 1, further comprising:
a gas pump coupled to receive the separated purge gas from the contractor-separator and the additional purge gas from the centrifuge-separator pump and configured to supply pressurized purge gas to the inert gas source.

3. The system of claim 2, wherein the gas pump comprises a liquid ring vacuum pump.

4. The system of claim 2, further comprising:
a coalescing filter coupled to receive the pressurized purge gas from the gas pump and configured to remove fuel aerosol that may be present in the pressurized purge gas.

5. The system of claim 1, further comprising:
a heat exchanger coupled between the boost pump and the passive contactor-separator, the heat exchanger coupled to receive the fuel/gas mixture from the pump and a fluid from a fluid source and configured to transfer heat from the fluid to the fuel/gas mixture to thereby increase fuel/gas mixture temperature prior to supplying the fuel/gas mixture to the passive contactor-separator.

6. The system of claim 5, further comprising:
a fuel filter coupled between the heat exchanger and the passive contactor-separator, the fuel filter configured to (i) remove particulate from the fuel/gas mixture and (ii) break up inert gas bubbles in the fuel/gas mixture into relatively smaller sized bubbles.

7. The system of claim 1, further comprising an inert gas source configured to supply the inert gas to the pump.

8. The system of claim 1, wherein the contactor-separator is configured as a passive contactor-separator.

9. An aircraft fuel deoxygenation system, comprising:
a boost pump adapted to receive fuel from a fuel source and inert gas from an inert gas source, the boost pump configured to mix the fuel and inert gas and supply a fuel/gas mixture;
a passive contactor-separator coupled to receive the fuel/gas mixture and configured to remove oxygen from the fuel and thereby generate and supply deoxygenated fuel with entrained purge gas and separated purge gas;
a centrifuge-separator pump coupled to receive the deoxygenated fuel with entrained purge gas and configured to separate and remove the entrained purge gas from the deoxygenated fuel and supply the deoxygenated fuel and additional purge gas; and
a gas pump coupled to receive the separated purge gas from the contactor-separator and the additional purge gas from the centrifuge-separator pump and configured to supply pressurized purge gas to the inert gas source.

10. The system of claim 9, wherein the gas pump comprises a liquid ring vacuum pump.

11. The system of claim 9, further comprising:
a coalescing filter coupled to receive the pressurized purge gas from the gas pump and configured to remove fuel aerosol that may be present in the pressurized purge gas.

12. The system of claim 9, further comprising:
a heat exchanger coupled to receive the fuel/gas mixture from the pump and a fluid from a fluid source and configured to transfer heat from the fluid to the fuel/gas mixture to thereby increase fuel/gas mixture temperature prior to supplying the fuel/gas mixture; and
a fuel filter coupled between the heat exchanger and the passive contactor-separator, the fuel filter configured to (i) remove particulate from the fuel/gas mixture and (ii) break up inert gas bubbles in the fuel/gas mixture into relatively smaller sized bubbles.

13. The system of claim 9, further comprising:
an inert gas source configured to supply the inert gas to the pump.

14. An aircraft fuel deoxygenation system, comprising:
an inert gas source for supplying inert gas;
a boost pump adapted to receive fuel from a fuel source and inert gas from the inert gas source, the boost pump configured to mix the fuel and inert gas and supply a fuel/gas mixture;
a contactor-separator coupled to receive the fuel/gas mixture and configured to remove oxygen from the fuel and thereby generate and supply deoxygenated fuel with entrained purge gas and separated purge gas;
a centrifuge-separator pump coupled to receive the deoxygenated fuel with entrained purge gas and configured to separate and remove the entrained purge gas from the deoxygenated fuel and supply the deoxygenated fuel and additional purge gas; and
a liquid ring vacuum pump coupled to receive the separated purge gas from the contactor-separator and the additional purge gas from the centrifuge-separator pump and configured to supply pressurized purge gas to the inert gas source.

15. The system of claim 14, further comprising:
a coalescing filter coupled between the liquid ring vacuum pump and the inert gas source and configured to remove fuel aerosol that may be present in the pressurized purge gas.

16. The system of claim 14, further comprising:
a heat exchanger coupled to receive the fuel/gas mixture from the pump and a fluid from a fluid source and configured to transfer heat from the fluid to the fuel/gas mixture to thereby increase fuel/gas mixture temperature prior to supplying the fuel/gas mixture.

17. The system of claim 16, further comprising:
a fuel filter coupled between the heat exchanger and the passive contactor-separator, the fuel filter configured to (i) remove particulate from the fuel/gas mixture and (ii) break up inert gas bubbles in the fuel/gas mixture into relatively smaller sized bubbles.

18. The system of claim 14, wherein the contactor-separator is configured as a passive contactor-separator.

* * * * *